US009723590B2

(12) United States Patent
Tang

(10) Patent No.: US 9,723,590 B2
(45) Date of Patent: Aug. 1, 2017

(54) METHOD FOR SWITCHING MONITORING FREQUENCY CHANNEL NUMBER BY ACCESS TERMINAL, AND ACCESS TERMINAL

(71) Applicant: Huawei Technologies Co., Ltd., Shenzhen (CN)

(72) Inventor: Nengfu Tang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/317,516

(22) PCT Filed: Jun. 9, 2014

(86) PCT No.: PCT/CN2014/079493
§ 371 (c)(1),
(2) Date: Dec. 9, 2016

(87) PCT Pub. No.: WO2015/188303
PCT Pub. Date: Dec. 17, 2015

(65) Prior Publication Data
US 2017/0127383 A1   May 4, 2017

(51) Int. Cl.
*H04W 72/02* (2009.01)
*H04W 24/06* (2009.01)

(52) U.S. Cl.
CPC ........... *H04W 72/02* (2013.01); *H04W 24/06* (2013.01)

(58) Field of Classification Search
CPC ..... H04W 72/04; H04W 72/02; H04W 24/06; H04W 24/08
See application file for complete search history.

(56) References Cited

U.S. PATENT DOCUMENTS

2003/0203735 A1   10/2003 Andrus et al.
2006/0217124 A1*  9/2006 Bi .................... H04W 48/10
                                                    455/450
(Continued)

FOREIGN PATENT DOCUMENTS

EP          2046081 B1      8/2010

OTHER PUBLICATIONS

"Connection Control Plane for Ultra Mobile Broadband (UMB) Air Interface Specification," 3rd Generation Partnership Project 2, 3GPP2 C.S0084-006-0, Version 2.0, Aug. 2007, 192 pages.
(Continued)

*Primary Examiner* — Dinh P Nguyen
(74) *Attorney, Agent, or Firm* — Conley Rose, P.C.

(57) ABSTRACT

A method for obtaining a monitoring frequency channel number, and an access terminal, where the method includes, when an Evolution-Data Optimized session of an access terminal is in a closed state or in an initialization process, and when a first expected frequency channel number obtained according to a first session seed and a first sector parameters message is different from a current frequency channel number of a signal currently received by a access terminal, generating, a second session seed, receiving, a second sector parameters message, obtaining, by the access terminal, a second expected frequency channel number according to the second sector parameters message, the second session seed, and a non-coherence parameter, and setting, the second expected frequency channel number as the monitoring frequency channel number when the second expected frequency channel number is the same as the current frequency channel number.

15 Claims, 4 Drawing Sheets

(56) References Cited

U.S. PATENT DOCUMENTS

2006/0294241 A1* 12/2006 Cherian .................. H04L 67/14
709/227
2009/0109896 A1* 4/2009 Rashid ................ H04W 76/027
370/320

OTHER PUBLICATIONS

Foreign Communication From A Counterpart Application, European Application No. 14894296.4, Extended European Search Report dated May 22, 2017, 10 pages.

* cited by examiner

US 9,723,590 B2

METHOD FOR SWITCHING MONITORING FREQUENCY CHANNEL NUMBER BY ACCESS TERMINAL, AND ACCESS TERMINAL

CROSS-REFERENCE TO RELATED APPLICATIONS

This application is a U.S. National Stage of International Application No. PCT/CN2014/079493, filed Jun. 9, 2014, which is hereby incorporated by reference in its entirety.

TECHNICAL FIELD

The present disclosure relates to the field of communications technologies, and in particular, to a method for switching a monitoring frequency channel number by an access terminal, and an access terminal.

BACKGROUND

With an increasing requirement for accessing the Internet by a wireless device, a requirement for a radio packet data service also increases. In order to provide the wireless device with greater bandwidth, higher security, and wider coverage, an Evolution-Data Optimized (EVDO) technology appears and is widely applied.

Generally, in the EVDO technology, a base station provides multiple frequency channel numbers. In the EVDO technology, to keep load balance among frequency channel numbers, the base station maintains approximately equal quantities of access terminals camping on the frequency channel numbers. Therefore, an access terminal obtains, using a hash algorithm the same as that used by the base station, an expected frequency channel number, as a monitoring frequency channel number, from a frequency channel number list delivered by the base station. Further, one or more frequency channel numbers are provided in the frequency channel number list delivered by the base station, and the access terminal obtains, from the one or more frequency channel numbers provided in the frequency channel number list, a frequency channel number that may be expected to serve as the monitoring frequency channel number, that is, the expected frequency channel number, and then switches a monitoring frequency channel number of the access terminal to the expected frequency channel number.

In the other approaches, however, if an expected frequency channel number obtained by an access terminal is different from a frequency channel number of a signal currently received by the access terminal, namely, a current frequency channel number, the access terminal switches to the expected frequency channel number, that is, the access terminal switches a monitoring frequency channel number to the expected frequency channel number. For reasons such as incomplete network coverage, a problem such as poor signal coverage may exist in the expected frequency channel number obtained by the access terminal. As a result, the access terminal fails to switch the monitoring frequency channel number, and the access terminal repeatedly attempts to switch the frequency channel number. In this case, an EVDO service of the access terminal is unavailable. It can be learned that a technical problem of EVDO service unavailability caused by a failure to switch a monitoring frequency channel number exists in the other approaches.

SUMMARY

The present disclosure provides a method for switching a monitoring frequency channel number by an access terminal, and an access terminal in order to resolve a technical problem, existing in the other approaches, of EVDO service unavailability caused by a failure to switch a monitoring frequency channel number, and improve a success rate of switching a monitoring frequency channel number and quality of service of an EVDO service.

According to a first aspect, an embodiment of the present disclosure provides a method for switching a monitoring frequency channel number by an access terminal, where the method includes obtaining, by the access terminal, a first expected frequency channel number according to a first session seed and a first sector parameters message when an EVDO session of the access terminal is in a closed state or in an initialization process, determining whether the first expected frequency channel number is the same as a current frequency channel number, where the current frequency channel number is a frequency channel number of a signal currently received by the access terminal, generating, by the access terminal, a second session seed different from the first session seed when the first expected frequency channel number is different from the current frequency channel number, receiving, by the access terminal, a second sector parameters message, obtaining, by the access terminal, a second expected frequency channel number according to the second sector parameters message, the second session seed, and a non-coherence parameter, and switching, by the access terminal, a monitoring frequency channel number to the second expected frequency channel number when the second expected frequency channel number is the same as the current frequency channel number.

With reference to the first aspect, in a first possible implementation manner, obtaining a second expected frequency channel number according to the second sector parameters message, the second session seed, and a non-coherence parameter includes obtaining, by the access terminal, a hash index by performing a hash calculation on a quantity of frequency channel numbers in the second sector parameters message, the second session seed, and the non-coherence parameter, and obtaining, by the access terminal, the second expected frequency channel number corresponding to the hash index from the second sector parameters message.

With reference to the first aspect or the first possible implementation manner of the first aspect, in a second possible implementation manner, after generating, by the access terminal, a second session seed different from the first session seed, the method further includes sending the second session seed to a network side such that the network side can obtain, according to the second session seed, a sending frequency channel number that is the same as the second expected frequency channel number and used to send data to the access terminal.

With reference to the first aspect or the first or second possible implementation manner of the first aspect, in a third possible implementation manner, before obtaining, by the access terminal, a first expected frequency channel number according to a first session seed and a first sector parameters message, the method further includes determining whether the EVDO session is in the closed state or in the initialization process to obtain a determining result, and sending, by the access terminal to the network side, a notification message that is used to close the EVDO session when the determining result is no, and closing, by access terminal, the EVDO session.

With reference to the first aspect, or any one of the first to third possible implementation manners of the first aspect, in a fourth possible implementation manner, generating, by the access terminal, a second session seed different from the first session seed when the first expected frequency channel number is different from the current frequency channel number includes camping, by the access terminal, on the monitoring frequency channel number when the first expected frequency channel number is different from the current frequency channel number, determining whether a quantity of times the first expected frequency channel number different from the current frequency channel number is obtained is greater than or equal to a quantity of frequency channel numbers in the first sector parameters message, and generating, by the access terminal, the second session seed different from the first session seed when the quantity of the times the current frequency channel number differs from the first expected frequency channel number is greater than or equal to the quantity of frequency channel numbers in the first sector parameters message.

According to a second aspect, an embodiment of the present disclosure provides an access terminal, including a processing unit configured to obtain a first expected frequency channel number according to a first session seed and a first sector parameters message when an EVDO session of the access terminal is in a closed state or in an initialization process, determine whether the first expected frequency channel number is the same as a current frequency channel number, where the current frequency channel number is a frequency channel number of a signal currently received by the access terminal, and generate, by the access terminal, a second session seed different from the first session seed when it is determined that the first expected frequency channel number is different from the current frequency channel number, a receiving unit configured to receive a second sector parameters message, where the processing unit is further configured to obtain a second expected frequency channel number according to the second sector parameters message, the second session seed, and a non-coherence parameter, and a switching unit configured to switch, by the access terminal, a monitoring frequency channel number to the second expected frequency channel number when the second expected frequency channel number is the same as the current frequency channel number.

With reference to the second aspect, in a first possible implementation manner, the processing unit is further configured to obtain, by the access terminal, a hash index by performing a hash calculation on a quantity of frequency channel numbers in the second sector parameters message, the second session seed, and the non-coherence parameter, and obtain, by the access terminal, the second expected frequency channel number corresponding to the hash index from the second sector parameters message.

With reference to the second aspect or the first possible implementation manner, in a second possible implementation manner, the sending unit is further configured to send the second session seed to a network side such that the network side can obtain, according to the second session seed, a sending frequency channel number that is the same as the second expected frequency channel number and used to send data to the access terminal.

With reference to the second aspect or the first or second possible implementation manner, in a third possible implementation manner, the processing unit is further configured to determine whether the EVDO session is in the closed state or in the initialization process to obtain a determining result before the access terminal obtains the first expected frequency channel number according to the first session seed and the first sector parameters message, and send, to the network side, a notification message that is used to close the EVDO session when the determining result is no, and close the EVDO session.

With reference to the second aspect, or any one of the first to third possible implementation manners, in a fourth possible implementation manner, the processing unit is further configured to camp, by the access terminal, on the monitoring frequency channel number when the first expected frequency channel number is different from the current frequency channel number, and determine whether a quantity of times the first expected frequency channel number different from the current frequency channel number is obtained is greater than or equal to a quantity of frequency channel numbers in the first sector parameters message, and generate, by the access terminal, the second session seed different from the first session seed when the quantity of the times the current frequency channel number differs from the first expected frequency channel number is greater than or equal to the quantity of frequency channel numbers in the first sector parameters message.

According to a third aspect, an embodiment of the present disclosure provides an access terminal, including one or more processors, a memory, a receiver, and one or more programs, where the one or more programs are stored in the memory and are used to be executed by the one or more processors, and the one or more programs include an instruction for obtaining a first expected frequency channel number according to a first session seed and a first sector parameters message when an EVDO session of the access terminal is in a closed state or in an initialization process, an instruction for determining whether the first expected frequency channel number is the same as a current frequency channel number, where the current frequency channel number is a frequency channel number of a signal currently received by the access terminal, an instruction for generating, by the access terminal, a second session seed different from the first session seed when the first expected frequency channel number is different from the current frequency channel number, an instruction for receiving, using the receiver, a second sector parameters message, an instruction for obtaining a second expected frequency channel number according to the second sector parameters message, the second session seed, and a non-coherence parameter, and an instruction for switching, by the access terminal, a monitoring frequency channel number to the second expected frequency channel number when the second expected frequency channel number is the same as the current frequency channel number.

With reference to the third aspect, in a first possible implementation manner, the instruction for obtaining a second expected frequency channel number according to the second sector parameters message, the second session seed, and a non-coherence parameter includes an instruction for obtaining, by the access terminal, a hash index by performing a hash calculation on a quantity of frequency channel numbers in the second sector parameters message, the second session seed, and the non-coherence parameter, and an instruction for obtaining, by the access terminal, the second expected frequency channel number corresponding to the hash index from the second sector parameters message.

With reference to the second aspect or the first possible implementation manner, in a second possible implementation manner, the one or more programs further include an instruction for sending the second session seed to a network side such that the network side can obtain, according to the second session seed, a sending frequency channel number that is the same as the second expected frequency channel number and used to send data to the access terminal.

With reference to the second aspect or the first or second possible implementation manner, in a third possible implementation manner, the one or more programs further include an instruction for determining whether the EVDO session is in the closed state or in the initialization process to obtain a determining result before the access terminal obtains the first expected frequency channel number according to the first session seed and the first sector parameters message, and an instruction for sending, to the network side, a notification message that is used to close the EVDO session, and closing the EVDO session when the determining result is no.

With reference to the second aspect, or any one of the first to third possible implementation manners, in a fourth possible implementation manner, the instruction for generating, by the access terminal, a second session seed different from the first session seed when the first expected frequency channel number is different from the current frequency channel number includes an instruction for camping, by the access terminal, on the monitoring frequency channel number when the first expected frequency channel number is different from the current frequency channel number, and an instruction for determining whether a quantity of times the first expected frequency channel number different from the current frequency channel number is obtained is greater than or equal to a quantity of frequency channel numbers in the first sector parameters message, and an instruction for generating, by the access terminal, the second session seed different from the first session seed when the quantity of the times the current frequency channel number differs from the first expected frequency channel number is greater than or equal to the quantity of frequency channel numbers in the first sector parameters message.

The foregoing one or more technical solutions in the embodiments of the present disclosure have at least the following technical effects.

The access terminal generate a second session seed, that is, a new session seed when a first expected frequency channel number obtained by an access terminal according to a first session seed and a first sector parameters message is different from a current frequency channel number of a signal currently received by the access terminal, obtains a second expected frequency channel number, that is, a new expected frequency channel number according to the second session seed, a second sector parameters message, and a non-coherence parameter, and uses the second expected frequency channel number as a monitoring frequency channel number of the access terminal, that is, uses the current frequency channel number as the monitoring frequency channel number when the second expected frequency channel number is the same as the current frequency channel number. Because a signal can be received on the current frequency channel number, the access terminal can successfully switch the monitoring frequency channel number, which resolves a technical problem, existing in the other approaches, of EVDO service unavailability caused by a failure to switch a monitoring frequency channel number, and improves a success rate of switching a monitoring frequency channel number and quality of service of an EVDO service.

DESCRIPTION OF EMBODIMENTS

Figure 1:
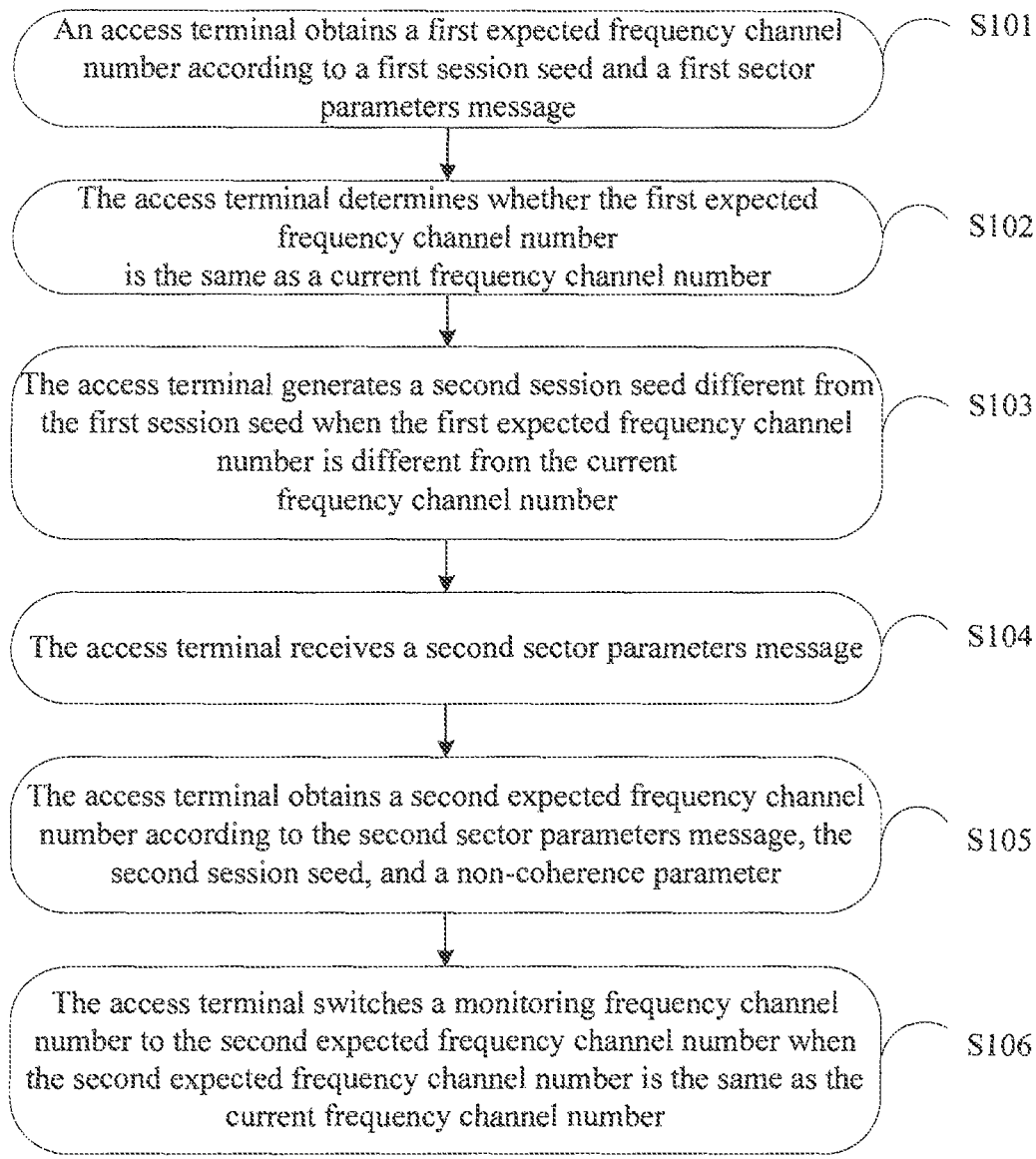
FIG. 1 is a schematic flowchart of a method for obtaining a monitoring frequency channel number according to Embodiment 1 of the present disclosure.

To resolve a technical problem in the other approaches of EVDO service unavailability caused by a failure to switch a monitoring frequency channel number, the embodiments of the present disclosure provide a method for switching a monitoring frequency channel number by an access terminal, and an access terminal.

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

A person skilled in the art can understand that, although the method described in the embodiments of the present disclosure and the following other embodiments includes multiple operations appearing in a specific order, the method may include more or fewer operations, where these operations may be executed in an order or executed in parallel, and the order is not a strict sequence.

The terms used in the embodiments of the present disclosure are merely for the purpose of illustrating specific embodiments, and are not intended to limit the present disclosure. The terms "a," "said" and "the" of singular forms used in the embodiments and the appended claims of the present disclosure are also intended to include plural forms, unless otherwise specified in the context clearly. It should also be understood that, the term "and/or" used herein indicates and includes any or all possible combinations of one or more associated listed items.

It should be understood that, although the terms, such as "first," "second," and "third" may be used in the embodiments of the present disclosure to describe various session seeds, sector parameters messages, and expected frequency channel numbers, the session seeds, the sector parameters messages, and the expected frequency channel numbers should not be limited by these terms. These terms are merely used to differentiate the session seeds, the sector parameters messages, and the expected frequency channel numbers. For example, without departing from the scope of the embodiments of the present disclosure, a first session seed may also be referred to as a second session seed, and similarly a second session seed may also be referred to as a first session seed.

Depending on the context, as used herein, the word "if" may be construed as "at the time of . . . " or "when . . . " or "in response to determining" or "in response to detecting." Similarly, depending on the context, the phrase "if it is determined," or "if it is detected (the described condition or event)" may be construed as "when determining," "in response to determining," "when detecting (the described condition or event)," or "in response to detecting (the described condition or event)."

The following describes exemplary implementation manners of the present disclosure in detail with reference to the accompanying drawings.

Embodiment 1

Referring to FIG. 1, an embodiment of the present disclosure provides a method for switching a monitoring frequency channel number by an access terminal, where the method includes the following steps.

Step S101: An access terminal obtains a first expected frequency channel number according to a first session seed and a first sector parameters message. An EVDO session of the access terminal is in a closed state or in an initialization process.

Step S102: The access terminal determines whether the first expected frequency channel number is the same as a current frequency channel number, where the current frequency channel number is a frequency channel number of a signal currently received by the access terminal.

Step S103: The access terminal generates a second session seed different from the first session seed when the first expected frequency channel number is different from the current frequency channel number.

Step S104: The access terminal receives a second sector parameters message.

Step S105: The access terminal obtains a second expected frequency channel number according to the second sector parameters message, the second session seed, and a non-coherence parameter.

Step S106: The access terminal switches a monitoring frequency channel number to the second expected frequency channel number when the second expected frequency channel number is the same as the current frequency channel number.

Figure 2:
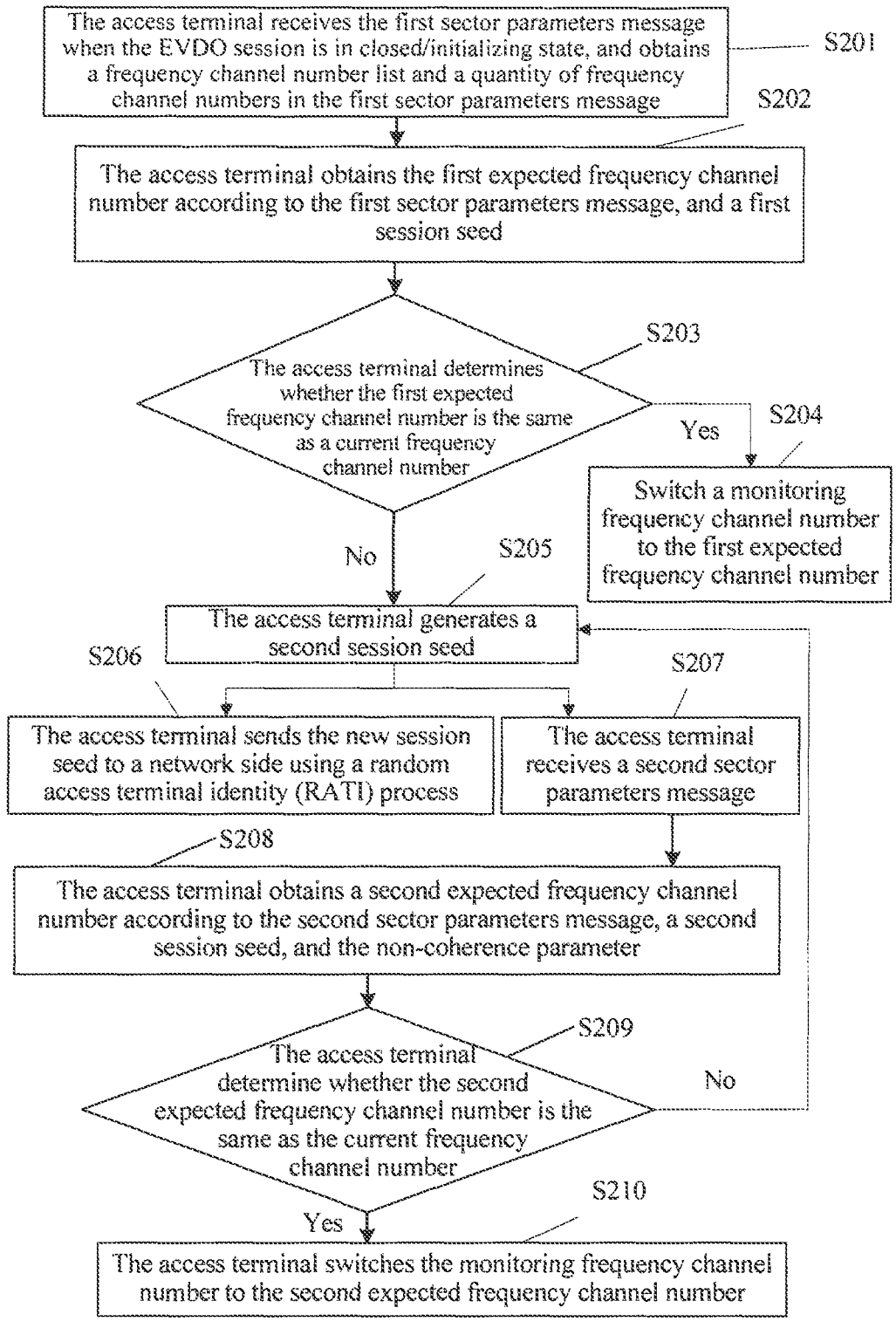
FIG. 2 is a flowchart of a first process of switching a monitoring frequency channel number according to Embodiment 1 of the present disclosure.

The EVDO session of the access terminal is in any one of three basic states the closed state (closed), the initialization process (initializing), and an open state (open). Generally, the access terminal initializes an EVDO session between the access terminal and an EVDO session of a network side in cases such as power-on and restarting. The EVDO session enters the closed state after the EVDO session between the access terminal and the network side ends. Referring to FIG. 2, a specific process in which the access terminal switches a monitoring frequency channel number when the EVDO session is in the closed state or in the initialization process is as follows.

Step S201: The access terminal receives the first sector parameters message when the EVDO session is in closed/initializing state, and obtains a frequency channel number list and a quantity of frequency channel numbers in the first sector parameters message.

Step S202: The access terminal obtains the first expected frequency channel number according to the first session seed and the first sector parameters message. Further, the access terminal uses the quantity of frequency channel numbers in the first sector parameters message, the first session seed, and the non-coherence parameter as input arguments, uses a hash function to calculate a hash index, and then obtains, from the first sector parameters message, a frequency channel number whose frequency channel number index is the hash index, as the first expected frequency channel number.

For example, if a hash index obtained by calculation is 11, a frequency channel number whose frequency channel number index is 11 is obtained from the first sector parameters message as the first expected frequency channel number. It should be noted that, a session seed is specified in an address management protocol, and is generally a random number generated based on time when a network is searched for the first time during EVDO. The non-coherence parameter is generally 0 by default, and certainly may also be set to another value.

Step S203: The access terminal determines whether the first expected frequency channel number is the same as the current frequency channel number, where the current frequency channel number is the frequency channel number of the signal currently received by the access terminal. If the first expected frequency channel number is the same as the current frequency channel number, it indicates that the access terminal can receive the signal well after the monitoring frequency channel number is switched to the expected frequency channel number, and the access terminal performs step S204 to switch the monitoring frequency channel number to the first expected frequency channel number, that is, the access terminal camps on the current frequency channel number. If the first expected frequency channel number is different from the current frequency channel number, it indicates that the access terminal may not be able to receive the signal from the first expected frequency channel number. Therefore, the access terminal does not switch the monitoring frequency channel number, that is, camps on the monitoring frequency channel number, and further performs step S205.

Step S205: The access terminal generates a second session seed, where the second session seed is different from the first session seed. Because an expected frequency channel number is generated according to the session seed, a sector parameters message, and the non-coherence parameter, if an error occurs in the session seed, accordingly, an error also occurs in the expected frequency channel number. Therefore, a new session seed, that is, a second session seed, is generated in this embodiment of this application in order to obtain the second expected frequency channel number according to the second session seed. The access terminal may re-activate an address management protocol stack such that the address management protocol stack generates, based on reactivation time, a new random number, that is, the second session seed. After step S205, the access terminal performs steps S206 and S207, where an execution sequence between steps S206 and S207 is not limited, that is, steps S206 and S207 may be performed at the same time, or step S206 or step S207 may be performed first.

Step S206: The access terminal sends the second session seed to a network side using a random access terminal identity (RATI)process such that the network side updates a session seed.

Step S207: The access terminal receives the second sector parameters message. Further, the access terminal obtains a frequency channel number list and a quantity of frequency channel numbers in the second sector parameters message. It should be noted that the access terminal receives the second sector parameters message by re-searching the network, where the received second sector parameters message may be the same as or may be different from the first sector parameters message. For example, the received second sector parameters message is the same as the first sector parameters message if a network in which the access terminal is located when performing step S207 is the same as a network in which the access terminal is located when performing step S201. The received second sector parameters message is different from the first sector parameters message if a network in which the access terminal is located when performing step S207 is different from a network in which the access terminal is located when performing step S201.

Step S208: The access terminal obtains the second expected frequency channel number according to the second sector parameters message, the second session seed, and the non-coherence parameter. A method for obtaining the second expected frequency channel number is the same as a method for obtaining the first expected frequency channel number. The quantity of frequency channel numbers in the second sector parameters message, the second session seed, and the non-coherence parameter are used as input arguments. A hash function is used to calculate a hash index, and then a frequency channel number whose frequency channel number index is the hash index is obtained from the second sector parameters message as the second expected frequency channel number.

Step S209: The access terminal determines whether the second expected frequency channel number is the same as the current frequency channel number. The access terminal does not switch the monitoring frequency channel number, and returns to step S205 if the second expected frequency channel number is different from the current frequency channel number. Otherwise, the access terminal performs step S210 if the second expected frequency channel number is the same as the current frequency channel number.

Step S210: The access terminal switches the monitoring frequency channel number to the second expected frequency channel number, and the procedure of switching a monitoring frequency channel number ends.

In a specific implementation process, the access terminal cannot switch the monitoring frequency channel number when the EVDO session of the access terminal is in the open state. Therefore, the access terminal provided in this embodiment of this application determines, before receiving the sector parameters message, whether the EVDO session of the access terminal is in the closed state or in the initialization process, to obtain a determining result, and sends, to the network side, a notification message that is used to close the EVDO session and closes the EVDO session such that the access terminal can switch the monitoring frequency channel number when the determining result is no. The access terminal switches the monitoring frequency channel number when the EVDO session between the access terminal and the network side is in the closed state or in the initialization process, and a specific process is as follows (refer to FIG. 3).

Step S301: The access terminal determines whether an EVDO session is in a closed state or in an initialization process. Further, the status of the EVDO session may be determined according to a status field of the EVDO session. For example, it is assumed that a status field "00" of the EVDO session represents closed, "01" represents initializing, and "10" represents open. The access terminal may determine whether the EVDO session is in the closed state or in the initialization process by determining whether the status field of the EVDO session is "00" or "01." The access terminal performs step S302 when the EVDO session is in the closed state or in the initialization process.

Step S302: The access terminal receives, by searching a network, a sector parameters message, for example, the first sector parameters message, sent by the network side (for example, a base station). Generally, a sector message carries a frequency channel number list that is provided by the network side for the access terminal to select the expected frequency channel number. After receiving the sector parameters message, the access terminal then performs step S303.

Step S303: The access terminal obtains an expected frequency channel number according to a quantity of frequency channel numbers in the sector parameters message, a session seed, and the non-coherence parameter.

For example, the quantity of frequency channel numbers in the first sector parameters message, the first session seed, and the non-coherence parameter are used as input arguments, a hash function is used to calculate a hash index, and then a frequency channel number whose frequency channel number index is the hash index is obtained from the first sector parameters message as the first expected frequency channel number. The non-coherence parameter is a preset number specified in an EVDO protocol, and generally a default value is 0. The first session seed may be a random number generated when the access terminal searches the network, based on time. After generating the first session seed, the access terminal sends the first session seed to the network side using a RATI process. For example, if the hash index obtained by calculation by the access terminal is 1, and a frequency channel number whose frequency channel number index is 1 in the first sector parameters message is a channel 119, the access terminal obtains the channel 119 as the first expected frequency channel number. Then, to avoid a failure in the monitoring frequency channel number, the access terminal further performs step S304.

Step S304: The access terminal determines whether the obtained expected frequency channel number is the same as the current frequency channel number. The current frequency channel number is from the signal currently received by the access terminal. If the determining result is that the obtained expected frequency channel number is the same as the current frequency channel number of the signal currently received by the access terminal, step S305 is proceeded, and step S306 is proceeded if the determining result is that the obtained expected frequency channel number is different from the current frequency channel number of the signal currently received by the access terminal.

Step S305: Switch the monitoring frequency channel number to the expected frequency channel number, that is, camp on the current frequency channel number, the procedure of obtaining a monitoring frequency channel number ends.

Step S306: Increase a counter that records a quantity of hash calculations, by one, and then perform step S307.

Step S307: The access terminal determines whether the count value of the counter is greater than or equal to a preset threshold N, where N is a positive integer. Preferably, N is a quantity of frequency channel numbers in a current sector parameters message, for example, N may be 3 if the quantity of frequency channel numbers in the sector parameters message is 3.

If it is determined in step S307 that the count value is less than N, for example, when the EVDO session is in the closed state or in the initialization process, a quantity of times that the access terminal obtains, according to the first session seed, the first expected frequency channel number different from the current frequency channel number is less than N, the access terminal camps on a current monitoring frequency channel number to avoid a failure to switch the monitoring frequency channel number, and returns to step S301, where the access terminal re-searches the network to receive a new sector parameters message, and generates a new expected frequency channel number according to the session seed, the new sector parameters message, and the non-coherence parameter in order to avoid obtaining an incorrect expected frequency channel number due to an incorrect sector parameter.

If it is determined in step S307 that the count value is greater than or equal to N, for example, when the EVDO session of the access terminal is in the closed state or in the initialization process, a quantity of times that the access terminal obtains, according to the first session seed, the first expected frequency channel number different from the current frequency channel number is greater than or equal to N, in this case, the access terminal performs step S308 to generate a new session seed, that is, the second session seed, and clears the counter at the same time.

In a specific implementation process, when it is determined in step S307 that the count value is greater than N, it indicates that a network around the access terminal is basically stable, but an expected frequency channel number the same as the current frequency channel number is still not obtained. The first session seed used by the access terminal to obtain the expected frequency channel number may be incorrect. Therefore, the access terminal performs step S308 to regenerate a second session seed different from the first session seed, that is, generate a new session seed. After generating the second session seed, the access terminal sends the second session seed to the network side using the RATI process such that the network side can obtain, according to the second session seed, a sending frequency channel number that is the same as the second expected frequency channel number and used to send data to the access terminal, thereby ensuring that the access terminal can receive the data sent by the network side.

After or when generating the second session seed, the access terminal performs step S302 to receive the second sector parameters message by re-searching the network. The first sector parameters message may be the same as or may be different from the second sector parameters message. Correspondingly, after receiving the second sector parameters message, the access terminal immediately performs step S303 to obtain the second expected frequency channel number according to the second sector parameters message, the second session seed, and the non-coherence parameter.

Further, the access terminal may obtain the hash index by performing a hash calculation on the quantity of frequency channel numbers in the second sector parameters message, the second session seed, and the non-coherence parameter, and then obtains the second expected frequency channel number corresponding to the hash index from the second sector parameters message. For example, the quantity of frequency channel numbers in the second sector parameters message, the second session seed, and the non-coherence parameter are used as input arguments, and the hash index obtained by calculation using the hash function is 3. It is assumed that a frequency channel number corresponding to a frequency channel number index 3 in the second sector parameters message is channel 178. The access terminal obtains the frequency channel number channel 178 whose frequency channel number index is 3 from the second sector parameters message as the second expected frequency channel number.

The access terminal further determines whether the second expected frequency channel number is the same as the current frequency channel number when the second expected frequency channel number is obtained. If the second expected frequency channel number is different from the current frequency channel number, the counter that is used to record a quantity of hash calculations is increased by 1, and then it is determined whether the count value of the counter is greater than or equal to N. Step S308→step S303→step S304 are repeatedly performed until the second expected frequency channel number the same as the current frequency channel number is obtained when a hash count value is greater than or equal to N. If the second expected frequency channel number is the same as the current frequency channel number, the access terminal performs step S305 to switch the monitoring frequency channel number to the second expected frequency channel number, that is, camp on the current frequency channel number. Example is as follows.

The current frequency channel number of the signal received by the access terminal is the channel 178, and the second expected frequency channel number obtained by the access terminal according to the second sector parameters message, the second session seed, and the non-coherence parameter is also the channel 178. Then, the access terminal uses the second expected frequency channel number channel 178 as the monitoring frequency channel number. Because the access terminal currently can receive a signal sent on the channel 178, which indicates that the channel 178 can cover the access terminal, the access terminal can successfully camp on the frequency channel number channel 178.

In the foregoing embodiment, the access terminal regenerates a second session seed when a first expected frequency channel number obtained by an access terminal according to a first session seed and a first sector parameters message is different from a current frequency channel number of a signal currently received by the access terminal, obtains a second expected frequency channel number according to the second session seed, a second sector parameter, and a non-coherence parameter, and uses the second expected frequency channel number as a monitoring frequency channel number of the access terminal, that is, uses the current frequency channel number as the monitoring frequency channel number when the second expected frequency channel number is the same as the current frequency channel number. Because a signal can be received on the current frequency channel number, the access terminal can successfully switch the monitoring frequency channel number, which resolves a technical problem, existing in the other approaches, of EVDO service unavailability caused by a failure to switch a monitoring frequency channel number, and improves a success rate of switching a monitoring frequency channel number and quality of service of an EVDO service.

Embodiment 2

Figure 4:
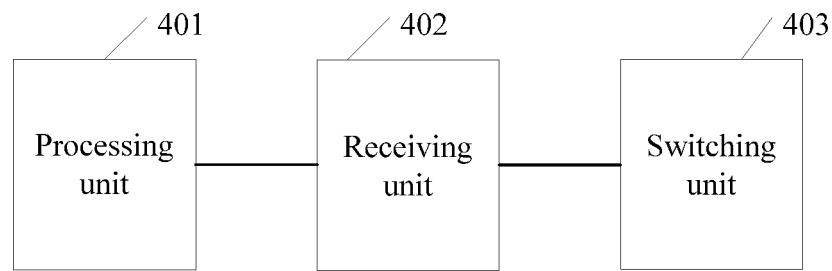
FIG. 4 is a block diagram of a structure of an access terminal according to Embodiment 2 of the present disclosure.

Referring to FIG. 4, an embodiment of this application provides an access terminal, including a processing unit 401 configured to obtain a first expected frequency channel number according to a first session seed and a first sector parameters message when an EVDO session of the access terminal is in a closed state or in an initialization process, determine whether the first expected frequency channel number is the same as a current frequency channel number, where the current frequency channel number is a frequency channel number of a signal currently received by the access terminal, and generate, by the access terminal, a second session seed different from the first session seed when the first expected frequency channel number is different from the current frequency channel number, a receiving unit 402 configured to receive a second sector parameters message, where the processing unit 401 is further configured to obtain a second expected frequency channel number according to the second sector parameters message, the second session seed, and a non-coherence parameter, and a switching unit 403 configured to switch, by the access terminal, a monitoring frequency channel number to the second expected frequency channel number when the second expected frequency channel number is the same as the current frequency channel number.

The processing unit 401 is further configured to obtain, by the access terminal, a hash index by performing a hash calculation on a quantity of frequency channel numbers in the second sector parameters message, the second session seed, and the non-coherence parameter, and obtain, by the access terminal, the second expected frequency channel number corresponding to the hash index from the second sector parameters message.

The processing unit 401 is further configured to send the second session seed to a network side such that the network side can obtain, according to the second session seed, a sending frequency channel number that is the same as the second expected frequency channel number and used to send data to the access terminal.

Before the access terminal obtains the first expected frequency channel number according to the first session seed and the first sector parameters message, the processing unit 401 is further configured to determine whether the EVDO session is in the closed state or in the initialization process, to obtain a determining result, and send, to the network side, a notification message that is used to close the EVDO session, and close the EVDO session when the determining result is no.

The processing unit 401 is further configured to camp, by the access terminal, on the monitoring frequency channel number when the first expected frequency channel number is different from the current frequency channel number, and determine whether a quantity of times the first expected frequency channel number different from the current frequency channel number is obtained is greater than or equal to a quantity of frequency channel numbers in the first sector parameters message, and generate, by the access terminal, the second session seed different from the first session seed when the quantity of the times the current frequency channel number differs from the first expected frequency channel number is greater than or equal to the quantity of frequency channel numbers in the first sector parameters message.

Figure 3:
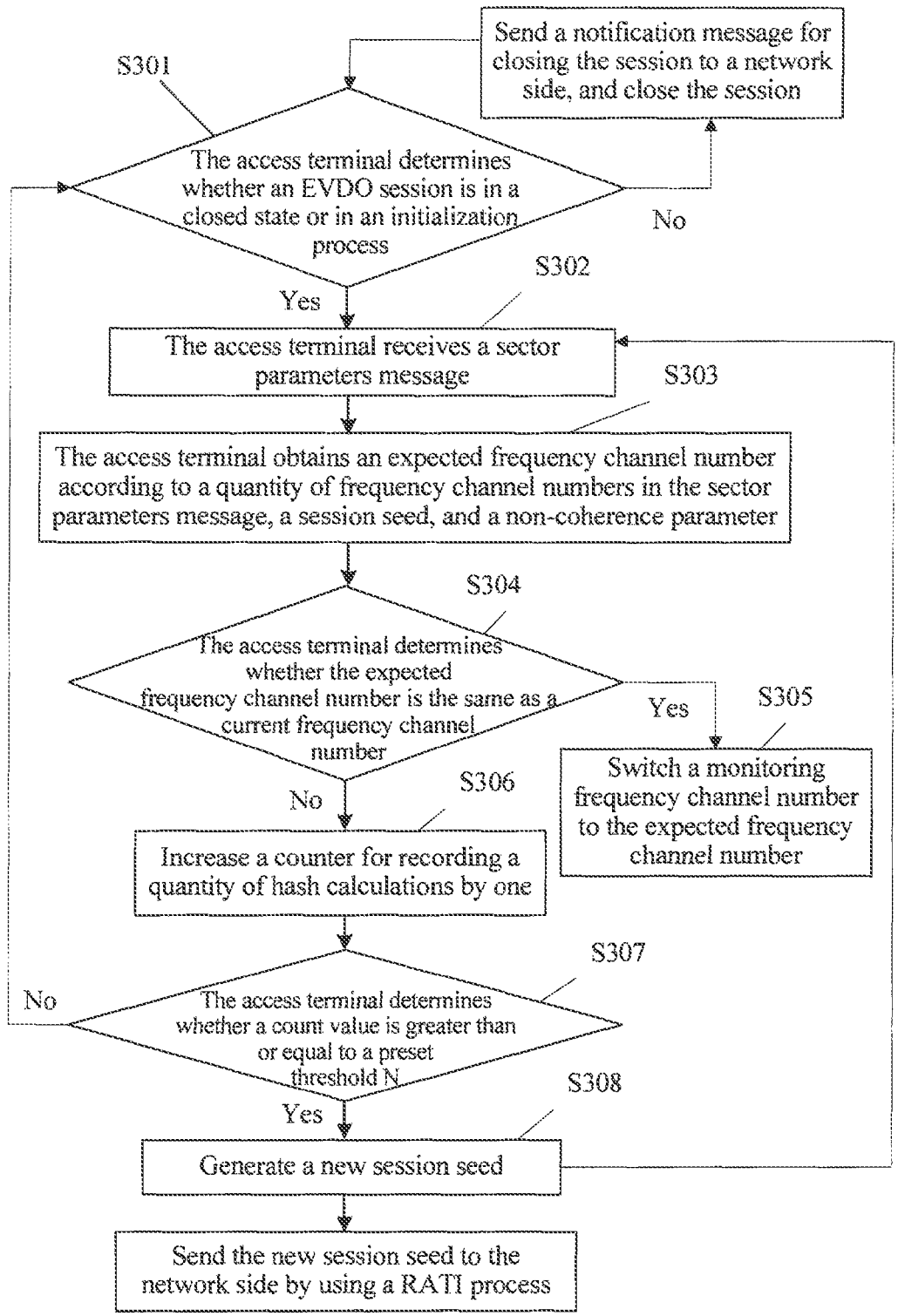
FIG. 3 is a flowchart of a second process of switching a monitoring frequency channel number according to Embodiment 1 of the present disclosure.

The various types of variations and specific instances in the foregoing methods for obtaining a monitoring frequency channel number in the foregoing embodiments in FIG. 1 to FIG. 3 are also applicable to the access terminal in this embodiment. With the foregoing detailed descriptions of the methods for obtaining a monitoring frequency channel number, a person of ordinary skill in the art can clearly understand the implementation manner of the access terminal in this embodiment. Therefore, for conciseness of the specification, details are not described herein again.

Embodiment 3

Figure 5:
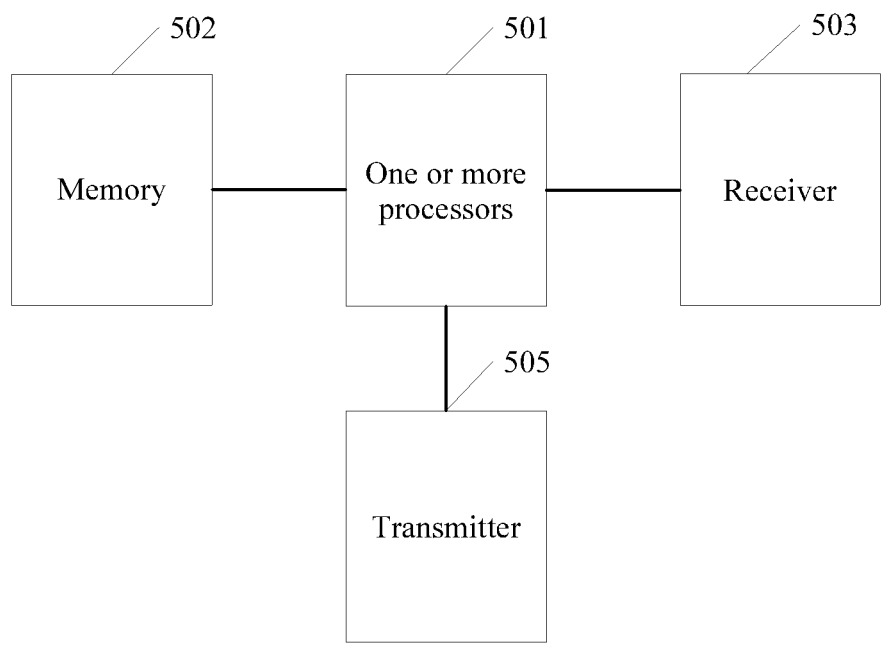
FIG. 5 is a block diagram of a structure of an access terminal according to Embodiment 3 of the present disclosure.

Referring to FIG. 5, an embodiment of the present disclosure provides a specific embodiment of the access terminal, where the mobile terminal switches a monitoring frequency channel number using the method in the foregoing embodiments. This embodiment of the present disclosure provides the access terminal, including one or more processors 501, a memory 502, a receiver 503, and one or more programs (not shown), where the one or more programs are stored in the memory 502 and are used to be executed by the one or more processors 501, and the one or more programs include an instruction for obtaining a first expected frequency channel number according to a first session seed and a first sector parameters message when an EVDO session of the access terminal is in a closed state or in an initialization process, an instruction for determining whether the first expected frequency channel number is the same as a current frequency channel number, where the current frequency channel number is a frequency channel number of a signal currently received by the access terminal, an instruction for generating, by the access terminal, a second session seed different from the first session seed when the first expected frequency channel number is different from the current frequency channel number, an instruction for receiving, using the receiver 503, a second sector parameters message, an instruction for obtaining a second expected frequency channel number according to the second sector parameters message, the second session seed, and a non-coherence parameter, and an instruction for switching, by the access terminal, a monitoring frequency channel number to the second expected frequency channel number when the second expected frequency channel number is the same as the current frequency channel number.

Further, the instruction for obtaining a second expected frequency channel number according to the second sector parameters message, the second session seed, and a non-coherence parameter includes an instruction for obtaining, by the access terminal, a hash index by performing a hash calculation on a quantity of frequency channel numbers in the second sector parameters message, the second session seed, and the non-coherence parameter, and an instruction for obtaining, by the access terminal, the second expected frequency channel number corresponding to the hash index from the second sector parameters message.

The one or more programs further include an instruction for sending, by a transmitter 505, the second session seed to a network side such that the network side can obtain, according to the second session seed, a sending frequency channel number that is the same as the second expected frequency channel number and used to send data to the access terminal.

Before the access terminal obtains the first expected frequency channel number according to the first session seed and the first sector parameters message, the one or more programs further include an instruction for determining whether the EVDO session is in the closed state or in the initialization process to obtain a determining result, and an instruction for sending, to the network side, a notification message that is used to close the EVDO session, and closing the EVDO session when the determining result is no.

Further, the instruction for generating, by the access terminal, a second session seed different from the first session seed when the first expected frequency channel number is different from the current frequency channel number includes an instruction for camping, by the access terminal, on the monitoring frequency channel number when the first expected frequency channel number is different from the current frequency channel number, and an instruction for determining whether a quantity of times the first expected frequency channel number different from the current frequency channel number is obtained is greater than or equal to a quantity of frequency channel numbers in the first sector parameters message, and an instruction for generating, by the access terminal, the second session seed different from the first session seed when the quantity of the times the current frequency channel number differs from the first expected frequency channel number is greater than or equal to the quantity of frequency channel numbers in the first sector parameters message.

The various types of variations and specific instances in the foregoing methods for obtaining a monitoring frequency channel number in the foregoing embodiments in FIG. 1 to FIG. 3 are also applicable to the access terminal in this embodiment. With the foregoing detailed descriptions of the methods for obtaining a monitoring frequency channel number, a person of ordinary skill in the art can clearly understand the implementation manner of the access terminal in this embodiment. Therefore, for conciseness of the specification, details are not described herein again.

One or more embodiments of the present disclosure may implement the following technical effects.

When a first expected frequency channel number obtained by an access terminal according to a first session seed and a first sector parameters message is different from a current frequency channel number of a signal currently received by the access terminal, the access terminal regenerates a second session seed, obtains a second expected frequency channel number according to the second session seed, a second sector parameter, and a non-coherence parameter, and uses the second expected frequency channel number as a monitoring frequency channel number of the access terminal, that is, uses the current frequency channel number as the monitoring frequency channel number when the second expected frequency channel number is the same as the current frequency channel number. Because a signal can be received on the current frequency channel number, the access terminal can successfully switch the monitoring frequency channel number, which resolves a technical problem, existing in the other approaches, of EVDO service unavailability caused by a failure to switch a monitoring frequency channel number, and improves a success rate of switching a monitoring frequency channel number and quality of service of an EVDO service.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc read-only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the exemplary embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A method for switching a monitoring frequency channel number by an access terminal, comprising:
   obtaining, by the access terminal, a first expected frequency channel number according to a first session seed and a first sector parameters message when an Evolution-Data Optimized session of the access terminal is in a closed state;
   determining whether the first expected frequency channel number is the same as a current frequency channel number, wherein the current frequency channel number is a frequency channel number of a signal currently received by the access terminal;
   generating, by the access terminal, a second session seed different from the first session seed when the first expected frequency channel number is different from the current frequency channel number;
   receiving, by the access terminal, a second sector parameters message;
   obtaining, by the access terminal, a second expected frequency channel number according to the second sector parameters message, the second session seed, and a non-coherence parameter; and
   switching, by the access terminal, the monitoring frequency channel number to the second expected frequency channel number when the second expected frequency channel number is the same as the current frequency channel number.

2. The method according to claim 1, wherein obtaining the second expected frequency channel number comprises:
   obtaining, by the access terminal, a hash index by performing a hash calculation on a quantity of frequency channel numbers in the second sector parameters message, the second session seed, and the non-coherence parameter; and
   obtaining, by the access terminal, the second expected frequency channel number corresponding to the hash index from the second sector parameters message.

3. The method according to claim 1, wherein after generating the second session seed different from the first session seed, the method further comprises sending the second session seed to a network side such that the network side can obtain, according to the second session seed, a sending frequency channel number that is the same as the second expected frequency channel number and used to send data to the access terminal.

4. The method according to claim 1, wherein before obtaining the first expected frequency channel number, the method further comprises:
    determining whether the Evolution-Data Optimized session is in the closed state to obtain a determining result; and
    sending, by the access terminal to a network side, a notification message that is used to close the Evolution-Data Optimized session, and closing, by access terminal, the Evolution-Data Optimized session when the determining result is that the Evolution-Data Optimized session is not in the closed state.

5. The method according to claim 1, wherein generating the second session seed different from the first session seed comprises:
    camping, by the access terminal, on the monitoring frequency channel number when the first expected frequency channel number is different from the current frequency channel number;
    determining whether a quantity of times the first expected frequency channel number different from the current frequency channel number is obtained is greater than or equal to a quantity of frequency channel numbers in the first sector parameters message; and
    generating, by the access terminal, the second session seed different from the first session seed when a quantity of the times the current frequency channel number differs from the first expected frequency channel number is greater than or equal to the quantity of frequency channel numbers in the first sector parameters message.

6. A method for switching a monitoring frequency channel number by an access terminal, comprising:
    obtaining, by the access terminal, a first expected frequency channel number according to a first session seed and a first sector parameters message when an Evolution-Data Optimized session of the access terminal is in an initialization process;
    determining whether the first expected frequency channel number is the same as a current frequency channel number, wherein the current frequency channel number is a frequency channel number of a signal currently received by the access terminal;
    generating, by the access terminal, a second session seed different from the first session seed when the first expected frequency channel number is different from the current frequency channel number;
    receiving, by the access terminal, a second sector parameters message;
    obtaining, by the access terminal, a second expected frequency channel number according to the second sector parameters message, the second session seed, and a non-coherence parameter; and
    switching, by the access terminal, the monitoring frequency channel number to the second expected frequency channel number when the second expected frequency channel number is the same as the current frequency channel number.

7. The method according to claim 6, wherein obtaining the second expected frequency channel number comprises:
    obtaining, by the access terminal, a hash index by performing a hash calculation on a quantity of frequency channel numbers in the second sector parameters message, the second session seed, and the non-coherence parameter; and
    obtaining, by the access terminal, the second expected frequency channel number corresponding to the hash index from the second sector parameters message.

8. The method according to claim 6, wherein after generating the second session seed different from the first session seed, the method further comprises sending the second session seed to a network side such that the network side can obtain, according to the second session seed, a sending frequency channel number that is the same as the second expected frequency channel number and used to send data to the access terminal.

9. The method according to claim 6, wherein before obtaining the first expected frequency channel number, the method further comprises:
    determining whether the Evolution-Data Optimized session is in the initialization process to obtain a determining result; and
    sending, by the access terminal to a network side, a notification message that is used to close the Evolution-Data Optimized session, and closing, by access terminal, the Evolution-Data Optimized session when the determining result is that the Evolution-Data Optimized session is not in the initialization process.

10. The method according to claim 6, wherein generating the second session seed different from the first session seed comprises:
    camping, by the access terminal, on the monitoring frequency channel number when the first expected frequency channel number is different from the current frequency channel number;
    determining whether a quantity of times the first expected frequency channel number different from the current frequency channel number is obtained is greater than or equal to a quantity of frequency channel numbers in the first sector parameters message; and
    generating, by the access terminal, the second session seed different from the first session seed when a quantity of the times the current frequency channel number differs from the first expected frequency channel number is greater than or equal to the quantity of frequency channel numbers in the first sector parameters message.

11. An access terminal, comprising:
    a receiver;
    a memory storing one or more programs; and
    a processor coupled to the receiver and the memory and configured to:
        obtain a first expected frequency channel number according to a first session seed and a first sector parameters message when an Evolution-Data Optimized session of the access terminal is in a closed state or in an initialization process;
        determine whether the first expected frequency channel number is the same as a current frequency channel number, wherein the current frequency channel number is a frequency channel number of a signal currently received by the access terminal;
        generate, by the access terminal, a second session seed different from the first session seed when the first expected frequency channel number is different from the current frequency channel number;
        receive, using the receiver, a second sector parameters message;

obtain a second expected frequency channel number according to the second sector parameters message, the second session seed, and a non-coherence parameter; and switch, by the access terminal, a monitoring frequency channel number to the second expected frequency channel number when the second expected frequency channel number is the same as the current frequency channel number.

12. The access terminal according to claim 11, wherein obtaining the second expected frequency channel number comprises:

obtaining, by the access terminal, a hash index by performing a hash calculation on a quantity of frequency channel numbers in the second sector parameters message, the second session seed, and the non-coherence parameter; and obtaining, by the access terminal, the second expected frequency channel number corresponding to the hash index from the second sector parameters message.

13. The access terminal according to claim 11, wherein the processor is further configured to send the second session seed to a network side such that the network side can obtain, according to the second session seed, a sending frequency channel number that is the same as the second expected frequency channel number and used to send data to the access terminal.

14. The access terminal according to claim 11, wherein the processor is further configured to:

determine whether the Evolution-Data Optimized session is in the closed state or in the initialization process to obtain a determining result before the access terminal obtains the first expected frequency channel number according to the first session seed and the first sector parameters message; and send, to a network side, a notification message that is used to close the Evolution-Data Optimized session, and closing the Evolution-Data Optimized session when the determining result is that the Evolution-Data Optimized session is not in the closed state or not in the initialization process.

15. The access terminal according to claim 11, wherein generating the second session seed different from the first session seed comprises:

camping, by the access terminal, on the monitoring frequency channel number when the first expected frequency channel number is different from the current frequency channel number;

determining whether a quantity of times the first expected frequency channel number different from the current frequency channel number is obtained is greater than or equal to a quantity of frequency channel numbers in the first sector parameters message; and generating, by the access terminal, the second session seed different from the first session seed when a quantity of the times the current frequency channel number differs from the first expected frequency channel number is greater than or equal to the quantity of frequency channel numbers in the first sector parameters message.

* * * * *